United States Patent
Furukawa

[11] Patent Number: 6,035,166
[45] Date of Patent: Mar. 7, 2000

[54] IMAGE FORMING APPARATUS FOR LIQUID DEVELOPMENT OF LATENT IMAGES

[75] Inventor: Toshio Furukawa, Nagoya, Japan

[73] Assignee: Brother Kogyo Kabushiki Kaisha, Nagoya, Japan

[21] Appl. No.: 09/221,036

[22] Filed: Dec. 28, 1998

[30] Foreign Application Priority Data

Dec. 29, 1997 [JP] Japan ................................ 9-369296

[51] Int. Cl.$^7$ ............................................. G03G 15/10
[52] U.S. Cl. ............................................................ 399/239
[58] Field of Search ............................ 399/57, 237, 238, 399/239, 241, 246, 247, 248, 249

[56] References Cited

U.S. PATENT DOCUMENTS

| | | | |
|---|---|---|---|
| 3,973,955 | 8/1976 | Ohno et al. | 399/237 X |
| 3,974,554 | 8/1976 | Fantuzzo | 399/239 X |
| 3,978,817 | 9/1976 | Hauser et al. | 399/239 |
| 3,991,711 | 11/1976 | Nakano et al. | 399/239 X |
| 4,299,902 | 11/1981 | Soma et al. | 399/248 X |
| 4,982,692 | 1/1991 | Uematsu | 399/239 |
| 4,990,962 | 2/1991 | Kishi | 399/249 X |

FOREIGN PATENT DOCUMENTS

B2-54-25418  8/1979  Japan.

*Primary Examiner*—Sandra L Brase
*Attorney, Agent, or Firm*—Oliff & Berridge, PLC

[57] ABSTRACT

An image forming apparatus comprises an image bearing member which is able to carry latent image and a reservoir in which liquid developer is stored. The liquid developer is transferred and adhered to the latent image so that the liquid developer develops the latent image. The liquid developer presents liquid state at least when the liquid developer develops the latent image. The image forming apparatus further comprises a developer retainer (being faced with the image bearing member) having fine holes through which the liquid developer is transferred to the image bearing member, and a developer supplier which supplies the liquid developer from the reservoir to the developer retainer. Each of the fine holes has an exit opening through which the liquid developer moves out of the fine hole and moves to the image bearing member. Each of the fine holes has a part in which a cross sectional area thereof increases as a distance from the exit opening decreases.

24 Claims, 9 Drawing Sheets

IMAGE FORMING APPARATUS FOR LIQUID DEVELOPMENT OF LATENT IMAGES

BACKGROUND OF THE INVENTION

This invention relates to an image forming apparatus which develops image by means of liquid developer.

A conventional image forming apparatus uses insulating liquid developer. The insulating liquid developer is made by dispersing toner particles in insulating liquid such as aliphatic saturated hydrocarbon. In an image developing process, electrostatic latent image is formed on an image bearing member (such as a dielectric member). The insulating liquid developer contacts with the image bearing member. Then, the toner particles in the insulating liquid developer m-grate to electrostatic latent image on the image bearing member, due to electrical migration. Consequently, the toner particles selectively adhere to the electrostatic latent image on the image bearing member.

Compared with an image forming apparatus using dry toner powders, the image forming apparatus using the liquid developer has an advantage that the toner particles in the liquid developer are smaller than dry toner powders, which is suitable for producing image of a high resolution. Further, the toner particles in the liquid developer are fixed to a recording media with less energy, compared with dry toner powders.

However, due to a smell of aliphatic saturated hydrocarbon, the image forming apparatus using the insulating liquid developer is not suitable for the use in office and home. On the other hand, if aquatic liquid developer is used in the above-mentioned image forming apparatus, the electrostatic latent image on the image bearing member may disappear when the aquatic liquid contacts the image bearing member (because of the conductivity of the aquatic liquid).

Japanese Patent Publication No. 54-25418 discloses an image forming apparatus using aquatic liquid developer. In such an image forming apparatus, the image bearing member and the aquatic liquid developer are faced with each other, with a minute gap provided therebetween. With this, the aquatic liquid developer flies across the gap and adhere to electrostatic latent image on the image bearing member.

In such an image forming apparatus, it is necessary to control the minute gap between the surface of the aquatic liquid developer and the image bearing member, for obtaining image of a high resolution. However, such a controlling of the minute gap is difficult.

In order to solve this problem, it is studied to provide a mesh developer retainer for holding the liquid developer (Japanese Patent Application No. HEI 9-234258). The developer retainer has a number of fine holes in which the liquid developer is held.

However, in such a mesh developer retainer, it is still difficult to control the gap between the surface of the liquid developer and the image bearing member. That is, if the developer retainer is made of material which repels the liquid developer, the liquid developer does not easily flows in the fine holes. Conversely, if the developer retainer is made of material which is wettable to the liquid developer, the liquid developer tends to flow through the fine holes to the image bearing member.

Additionally, in the mesh developer retainer, the surface of the liquid developer held in each fine hole is concave-shaped due to the surface tension. That is, a center of the surface of the liquid developer in each fine hole is o shifted away from the image bearing member. With this, the density of the electric flux lines (generated by the electrostatic latent image on the image bearing member) is dispersed throughout the surface of the liquid developer in each fine hole. This weakens the electrostatic force acted on the liquid developer, which prevents the development of image of a high resolution.

SUMMARY OF THE INVENTION

It is therefore an object of the present invention to provide an image forming apparatus in which aquatic liquid developer can be used and which is able to print image of a high resolution.

For the above object, according to an aspect of the present invention, there is provided an image forming apparatus comprising an image forming apparatus comprising an image bearing member which is able to carry latent image and a reservoir in which liquid developer is stored. The liquid developer is transferred and adhered to the latent image so that the liquid developer develops the latent image. The liquid developer presents liquid state at least when the liquid developer develops the latent image. The image forming apparatus further comprises a developer retainer (being faced with the image bearing member) having fine holes through which the liquid developer is transferred to the image bearing member, and a developer supplier which supplies the liquid developer from the reservoir to the developer retainer. Each of the fine holes has an exit opening through which the liquid developer moves out of the fine hole and moves to the image bearing member. Each of the fine holes has a part in which a cross sectional area thereof increases as a distance from the exit opening decreases.

With such an arrangement, the surface area of the surface (of the liquid developer) opposing to the image bearing member changes according to the position along the depth of the fine hole. Thus, it is easy to control the position of the liquid developer along the depth of the fine hole. Further, in the part of the fine hole in which a cross sectional area increases as the distance from the exit opening decreases, the surface of the liquid developer in each fine hole is convex-shaped. That is, a center of the surface of the liquid developer projects toward the image bearing member. Accordingly, the density of the electric flux lines (generated by the electrostatic latent image on the image bearing member) concentrate on the center of the surface of the liquid developer in the fine hole of the developer retainer. Thus, the liquid developer in the fine hole easily flies to the electrostatic latent image an the image bearing member. Thus, image of a high resolution is produced.

In a particular arrangement, the fine hole comprises a tapered part and a straight part, the tapered part being proximate to the exit opening. With this, a convex liquid surface is formed in the tapered part of the fine hole.

In another particular arrangement, the fine hole comprises a bowl-shaped part and a straight part, the bowl-shaped part being proximate to the exit opening. With this, a convex liquid surface is formed in the bowl-shaped part of the fine hole. In still another particular arrangement, the fine hole has a bell-shaped part.

In a further particular arrangement, the fine hole comprises two straight holes having different diameters. One of the straight holes has a larger cross sectional area and is proximate to the exit opening. With this, a convex liquid surface is formed at a border surface of the straight holes.

In a further development, the fine hole has a narrow part formed between both ends of the fine hole. With this, liquid developer is easily introduced in the fine hole (from the liquid supplier). Further, the amount of the liquid developer held in the fine hole is relatively large.

Advantageously, the fine hole is provided with a hydrophilic part having a hydrophilia. With this, it is possible to keep the aquatic liquid developer in the fine hole, even though the repellant force between the aquatic liquid developer and the fine hole is too strong.

Optionally, the fine hole is provided with an electroconductive part which has a electronic conductivity. With this, it is possible to charge voltage to the liquid developer, so that the liquid developer tends to easily adhere to the electrostatic latent image.

In one preferred embodiment, the reservoir comprises a container in which the liquid developer is stored. The developer retainer comprises an endless-belt which circulates along a certain circulation path. The developer supplier comprises a rotatable feeder which receives the liquid developer in the container at a first rotational position and which transfers the liquid developer to the endless-belt at a second rotational position. The circulation path of the endless-belt comprising a position where the endless-belt contacts both the image bearing member and the rotatable feeder. With such an embodiment, the liquid developer stored in the container is carried by the rotatable feeder no the endless-belt, and carried by the endless-belt to the vicinity of the image forming member.

Further, the endless belt is supported by the rotatable feeder and at least two additional rollers. The container is provided in the space surrounded by the circulation path. With this, the arrangement of the image forming apparatus is compact in size.

In another preferred embodiment, the reservoir comprises an impregnation member in which the liquid developer is impregnated. The developer retainer comprises an endless-belt which circulates along first and second positions. The endless-belt contacts the impregnation member at the first position, and contacts the image bearing member at the second position. Further, the impregnation member comprises a porous roller. With such an embodiment, the liquid developer stored in the impregnation member is carried by the endless-belt to the vicinity of the image forming member. Since the liquid developer is impregnated in the impregnation member, the spill of the liquid developer is prevented.

Preferably, the endless belt is provided around the porous roller and at least one additional roller so that the endless belt circulates along the porous roller and the additional roller.

It is alternatively possible that the developer retainer is tubular-shaped. The liquid developer is supplied to the developer retainer from an inner side of the developing retainer.

In still another preferred embodiment, the reservoir comprises a container in which the liquid developer is stored. The developer retainer comprises an endless-belt which circulates around first and second positions. The endless-belt is soaked in the liquid developer in the container at the first position, and contacts the image bearing member at the second position. Further, the endless-belt is supported by two rollers so that the endless-belt circulates along the two rollers. With such an embodiment, the liquid developer is carried by the endless-belt to the vicinity of the image bearing member.

It is preferred to further provide an adjusting member which removes an excessive amount of the liquid developer from the developer retainer. This arrangement prevents unintentional adhering of the liquid developer onto the image forming member.

DESCRIPTION OF THE PREFERRED EMBODIMENT

An image forming apparatus embodying the invention will be described hereinafter by referring to the accompanying drawings.

Figure 1:
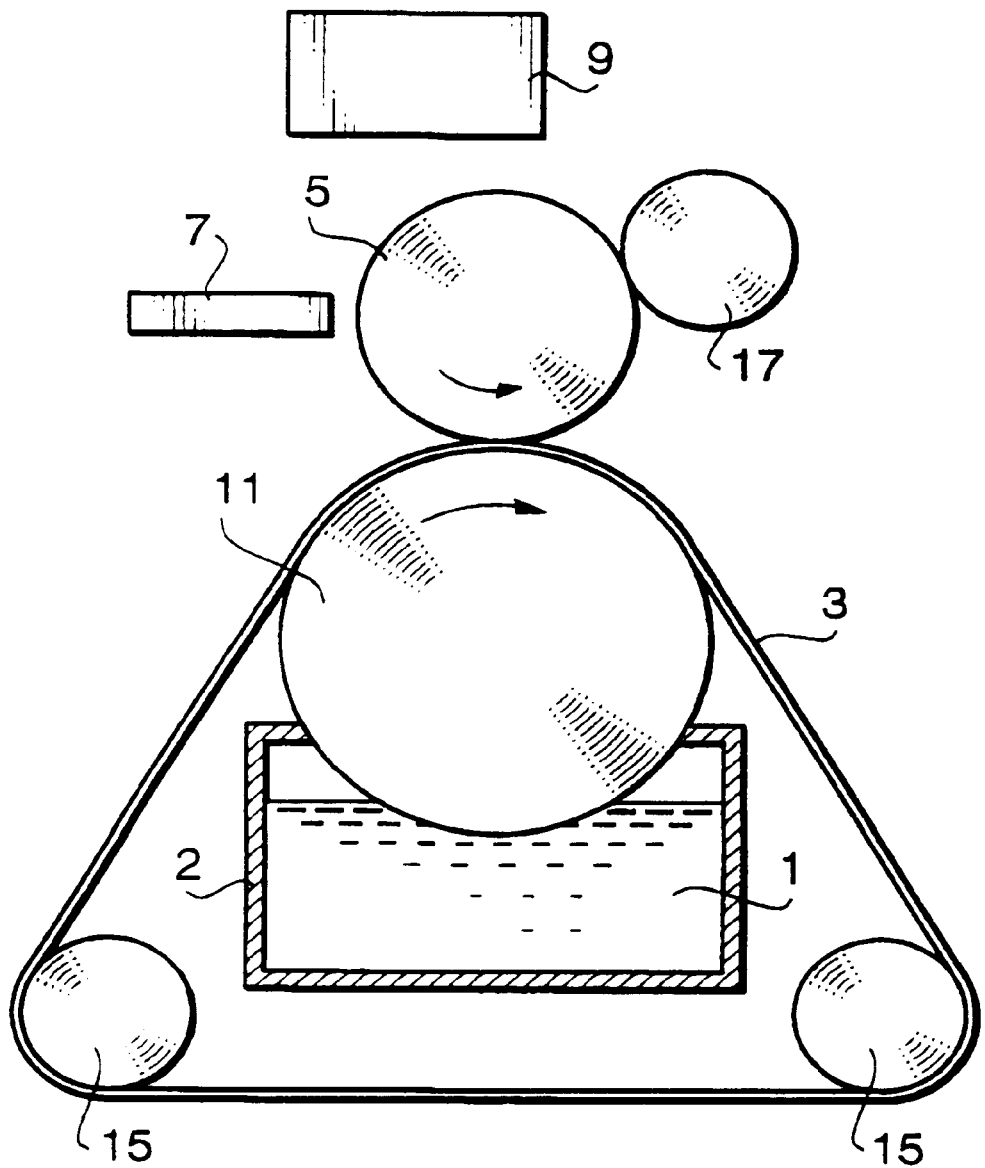
FIG. 1 is a side view of an image forming apparatus of an embodiment of the present invention.

FIG. 1 is a schematic view showing an image forming apparatus of an embodiment of the present invention. The image forming apparatus includes a photosensitive drum 5 on which electrostatic latent image is formed. Along the circumference of the photosensitive drum 5, a charging unit 9, an exposure unit 7, a developing roller 11 and a transfer roller 17 are disposed (counterclockwise in FIG. 1). A container 2 is provided beneath the photosensitive drum 5, in which liquid developer 1 is stored. The liquid developer 1 is made by dissolving or dispersing a coloring component (such as dye, pigment or the like) in aquatic liquid. Further, the image forming apparatus includes a developer retainer 3 which is belt-shaped and is provided with a number of fine holes 19 (FIGS. 2A and 2B) in which liquid developer 1 is held. The developer retainer 3 circulates along the developing roller 11 and two support rollers 15. The container 2 is provided in a space surrounded by a circulating path of the developer retainer 3. The developing roller 11 is so disposed that the developing roller 11 and the photosensitive drum 5 sandwich the developer retainer 3. Further, the transfer roller 17 is in contact with (or, in the proximity of) the photosensitive drum 5.

The developing roller 11 is a porous cylindrical roller that is rotatably supported by a not-shown shaft. The liquid developer 1 in the container 2 is caught in the pores of the developing roller 11. When the developing roller 11 rotates counterclockwise, the liquid developer 1 caught in the pores of the developing roller 11 is brought out of the container 2. In this state, the liquid developer 1 in the pores of the developing roller 11 is charged to plus voltage. Since the inner surface of the developer retainer 3 contacts the surface of the developing roller 11, the liquid developer 1 held in the pores of the developing roller 11 moves into the fine hole 19 of the developer retainer 3. The charging apparatus 9 uniformly charges a surface of the photosensitive drum 5 to minus voltage. By the irradiation by the exposure unit 7, latent image (charged to minus voltage) is formed on a surface of the photosensitive drum 5. When the latent image formed on the surface of the photosensitive drum 5 moves to the proximity of the liquid developer 1, charges in the liquid developer 1 are inducted by an electric field generated by the electrostatic latent image and move to the surface opposing to the electrostatic latent image. With this, the liquid developer 1 is attracted by the electrostatic latent image, so that the liquid developer 1 flies to and adheres to the electrostatic latent image on the photosensitive drum 5. It is also possible that the liquid developer 1 extends toward the electrostatic latent image on the photosensitive drum 5 and adheres thereto. Although the developer retainer 3 repels the liquid developer 1, the surface of the photosensitive drum 5 does not repel the liquid developer 1. Thus, the developer retainer 1 remains on the electrostatic latent image on the photosensitive drum 5.

The residual liquid developer 1 remaining in the developer retainer 3 returns to the pores of the developing roller 11, and returns to the container 2. It is preferable to use a device for removing the residual liquid developer from the pores of the developing roller 11.

The developed image (formed by the liquid developer 1) on the photosensitive drum 5 is transferred to the surface of the transfer roller 17. Alternatively, the developed image on the photosensitive drum 5 is transferred to a recording media (such as a paper) that is sandwiched between the transfer roller 17 and the photosensitive drum 5.

Figure 2A:
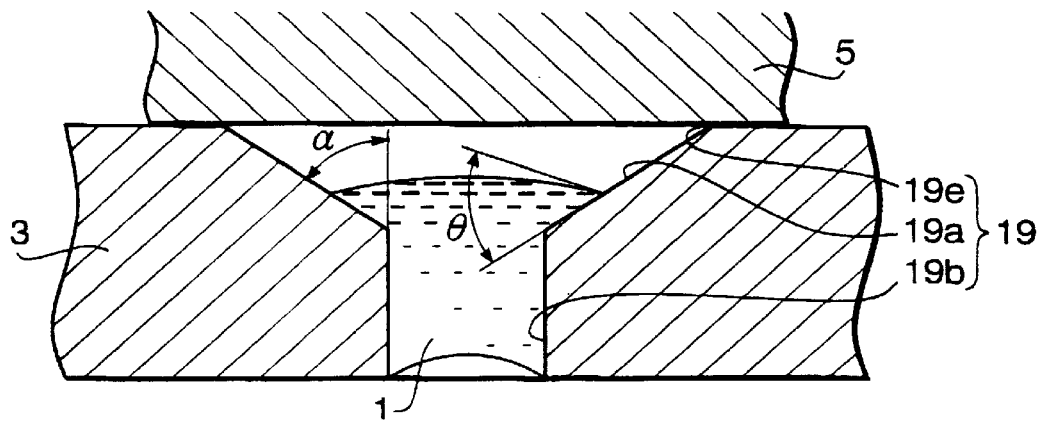
FIGS. 2A and 2B are an enlarged view of a developer retainer of the image forming apparatus shown in FIG. 1.
Figure 2B:
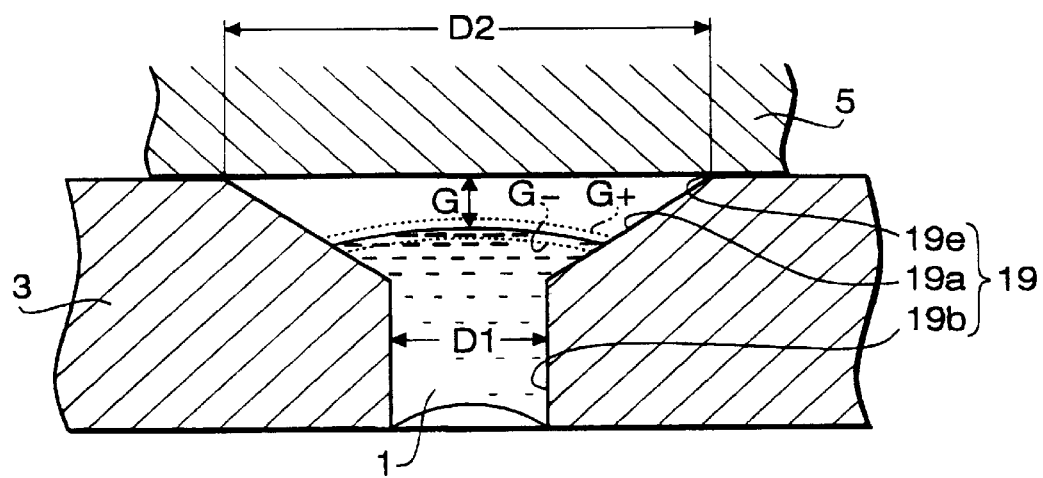

FIG. 2A and 2B are sectional views of the fine hole 19 of the developer retainer 3. The developer retainer 3 is made of material which repels the liquid developer 1 (for example, a water-repellant material). That is, the liquid developer 1 in the fine hole 19 is surrounded by an inner wall of material which repels the liquid developer 1. The fine hole 19 has an exit opening 19e through which the liquid developer 1 moves out of the fine hole 19 and moves to the photosensitive drum 5. Further, the fine hole 19 includes a tapered part 19a and a straight part 19b. The tapered part 19a is proximate to the exit opening 19e. The cross sectional area of the tapered part 19a increases as the distance from the exit opening 19e decreases. It is preferred that the tapered angle $\alpha$ of the tapered part 19a and a contact angle $\theta$ of the liquid developer 1 (with respect to the inner wall of the fine hole 19) satisfy the following relationship: $90°-\alpha<\theta$. With this, it is ensured that the surface of the liquid developer 1 is convex-shaped. It is further preferable that a 'retreating' contact angle of the liquid developer 1 satisfies the above described relationship.

Figure 9A:
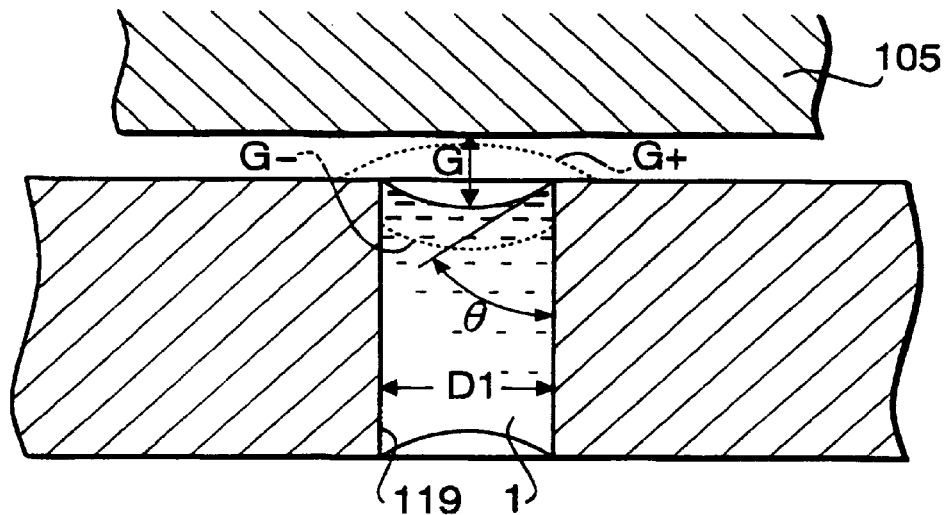
FIGS. 9A, 9B and 9C are schematic views showing examples of straight fine holes of developer retainer.
Figure 9B:
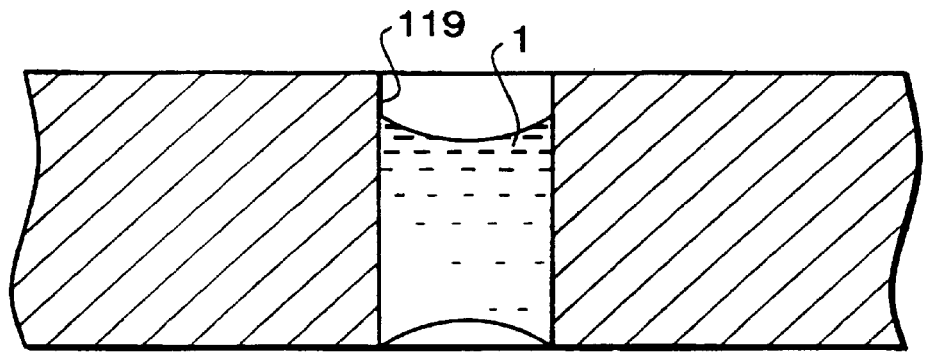
Figure 9C:
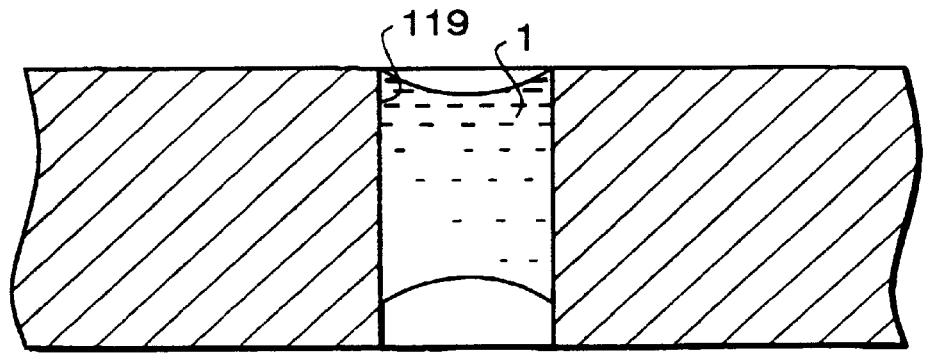

The advantage of the fine hole 19 of the embodiment is described in comparison with a straight hole 119 shown in FIGS. 9A through 9C. The cross sectional area of the straight hole 119 shown in FIGS. 9A through 9C is the same as that of the straight part 19b of the fine hole 19 of the embodiment shown in FIGS. 2A and 2B.

The position of the liquid developer 1 is stabilized where the surface areas of the top and bottom surfaces thereof are balanced. However, in the straight hole 119 shown in FIG. 9A, the cross section does not change along the depth of the fine hole 119. That is, the potential of the liquid developer 1 in the straight hole 119 is substantially the same irrespective of the position of the liquid developer 1. For example, the liquid developer 1 in the states shown in FIGS. 9B and 9C are substantially in the same potential. Thus, it is not easy to control the position of the liquid developer 1 in the straight hole 119. Thus, the possibility of the soiling of the image bearing member 105 may increase.

On the other hand, according to the embodiment shown in FIGS. 2A and 2B, since the cross sectional area of the tapered part 19a of the fine hole 19 changes according to the position along the depth of the fine hole 19. Thus, the surface area of the top surface of the liquid developer 1 changes according to the position along the depth of the fine hole 19. Thus, it is easy to control the position of the liquid developer 1 along the depth of the fine hole 19. That is, the potential of the liquid developer 1 in the fine hole 19 changes according to the position along the depth of the fine hole 19. Accordingly, it is easy to control the gap between the liquid developer 1 and the photosensitive drum 5.

In the straight hole 119, a normal line on the inner wall of the straight hole 119 is parallel to the surface of an image bearing member 105 (such as a photosensitive drum). Due to a contact angle $\theta$ (less than 90 degrees) of the liquid developer 1 with respect to the inner wall of the straight hole 119, the surface of the liquid developer 1 in the straight hole 119 is concave-shaped. That is, the center of the surface of the liquid developer 1 in the straight hole 119 shifts away from the image bearing member 105. In such case, the density of the electric flux lines (caused by the electrostatic latent image on the image bearing member 105) is dispersed, and does not concentrate on the center of the surface of the liquid developer 1 in the straight hole 119. Thus, the electrostatic force acted on the liquid developer 1 is weakened.

On the other hand, according to the embodiment shown in FIGS. 2A and 2B, the surface of the liquid developer 1 in the fine hole 19 is convex-shaped, since the inner wall of the tapered part 19a widens outward as the distance from the exit opening 19e decreases. Thus, the density of the electric flux lines (caused by the electrostatic latent image on the photosensitive drum 5) is concentrated on the center of the surface of the liquid developer 1 in the fine hole 19. Accordingly, the liquid developer 1 flies (or extends) to and adhere to the photosensitive drum 5 easily (with less energy). Further, since the liquid developer 1 flies to the photosensitive drum 5 from its center portion, the position where the liquid developer 1 adheres on the photosensitive drum 5 is stabilized. Accordingly, image of a high resolution is produced. Also, since the liquid developer 1 easily flies (or extends) to the photosensitive drum 5, image with gradation can be formed.

In the straight hole 119 shown in FIG. 9A, when the excessive amount of the liquid developer 1 is supplied to the straight hole 119, the liquid developer 1 flows out of the straight hole 119 and forms a convex surface (indicated by line G+) out of the straight hole 119. Thus, a whole excessive convex surface of the liquid developer 1 contacts the image bearing member 105, and even adheres to the non-latent image on the image bearing member 105. It soils the surface of the image bearing member 105.

On the other hand, according the embodiment shown in FIGS. 2A and 2B, even when the excessive amount of the liquid developer 1 is supplied to the fine hole 19, the excessive amount of the liquid developer 1 can be held in the tapered part 19a, since the tapered part 19a has a large capacity. It prevents the soiling on the surface of the photosensitive drum 5.

Further, in the straight hole 119 shown in FIG. 9A, when less amount of liquid developer 1 is supplied to the straight hole 119, the liquid developer 1 deeply retract in the straight hole 19 apart from the image bearing member 105, as shown by dash line G− in FIG. 9A. It increases the distance between the surface of the liquid developer 1 and the image bearing member 105. Thus, the liquid developer 1 does not easily fly to the image bearing member 105.

On the other hand, according the embodiment shown in FIGS. 2A and 2B, even when less amount of liquid developer 1 is supplied to the fine hole 19, the liquid developer 1 does not retract much (as shown by line G− in FIG. 2B), since the cross sectional area of the tapered part 19a is larger than the cross sectional area of the straight hole 119 (FIG. 9A). That is, the gap between the surface of the liquid developer 1 and the photosensitive drum 5 does not decrease much.

Thus, the liquid developer 1 easily adhered to the photosensitive drum 5.

FIGS. 3A through 3H are enlarged views of contact portion of the photosensitive drum 5 and the developer retainer 3, respectively illustrating the first to seventh alternative arrangements of the fine hole 19 of the developer retainer 3 of the embodiment. Elements in respective arrangement that are identical to elements in the previously described embodiment are assigned the same reference numerals and the description thereof is omitted.

Figure 3A:
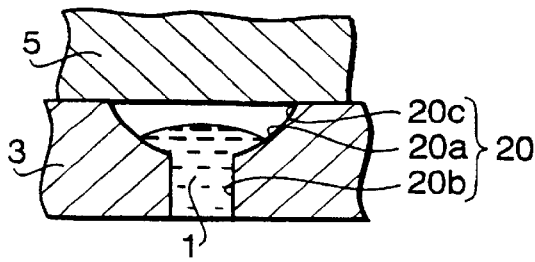
FIGS. 3A through 3H are enlarged views of the first through seventh alternative arrangements of the developer retainer of the embodiment.

FIG. 3A shows a first alternative arrangement of the fine hole 19. In this first alternative arrangement, a fine hole 20 includes a bowl-shaped part 20a and a straight part 20b. The bowl-shaped part 20a is proximate an exit opening 20c of the fine hole 20. The cross sectional area of the bowl-shaped part 20a increases as the distance from the exit opening 20c decreases. Further, the developer retainer 3 is made of material which repels the liquid developer 1.

According to this first alternative arrangement, a convex surface of the liquid developer 1 is formed in the bowl-shaped part 20a. Thus, when the electromagnetic force is applied on the liquid developer 1, the liquid developer 1 flies to the photosensitive drum 5 from its center. Accordingly, it is easy to control the position (in parallel to the surface of the photosensitive drum 5) of the liquid developer 1. Further, since the surface area of the top surface of the liquid developer 1 changes according to the position along the depth of the fine hole 20, the potential of the liquid developer 1 changes according to the position along the depth of the fine hole 19. Thus, it is easy to control the gap between the liquid developer 1 and the photosensitive drum 5.

Figure 3B:
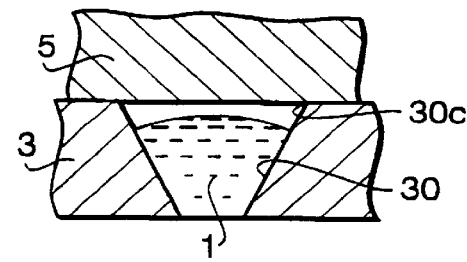

FIG. 3B shows the second alternative arrangement. In the second alternative arrangement, a fine hole 30 is formed in the shape of a tapered hole. The cross sectional area of the fine hole 30 increases as the distance from an exit opening 30c decreases.

According to this second alternative arrangement, a convex surface of the liquid developer 1 is formed in the fine hole 30. Further, since the surface area of the top and bottom surface of the liquid developer change according to the positions along the depth of the fine hole 30, it is easy to control the gap between the liquid developer 1 and the photosensitive drum 5.

Figure 3C:
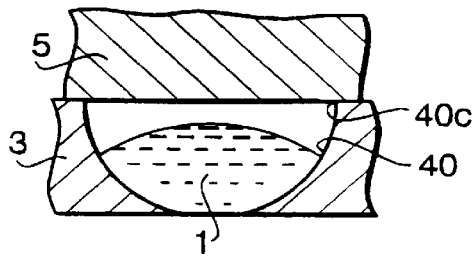

FIG. 3C shows the third alternative arrangement. In the third alternative arrangement, a fine hole 40 is formed in the shape of a bowl. The cross sectional area of the fine hole 40 increases as the distance from an exit opening 40c of the fine hole 40 decreases.

This third alternative arrangement has substantially the same advantage as the second alternative arrangement (FIG. 3B).

Figure 3D:
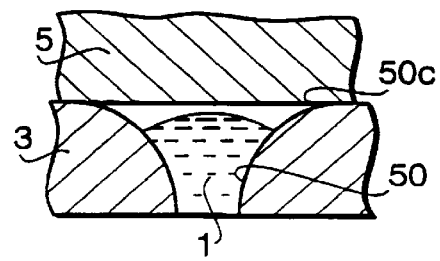

FIG. 3D shows the fourth alternative arrangement. In the fourth alternative arrangement, a fine hole 50 is bell-mouth-shaped so that the cross sectional area thereof increases as the distance from an exit opening 50c of the fine hole 50 decreases.

This fourth alternative arrangement has substantially the same advantage as the second and third alternative arrangements (FIGS. 3B and 3C).

Figure 3E:
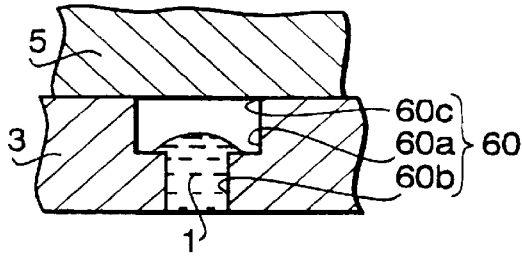

FIG. 3E shows the fifth alternative arrangement. In the fifth alternative arrangement, a fine hole 60 includes large and small straight holes 60a and 60b. The large straight hole 60a is proximate to an exit opening 60c of the fine hole 60.

According to this fifth alternative arrangement, a convex surface of the liquid developer 1 can be formed at a border of the large and small straight holes 60a and 60b.

Figure 3F:
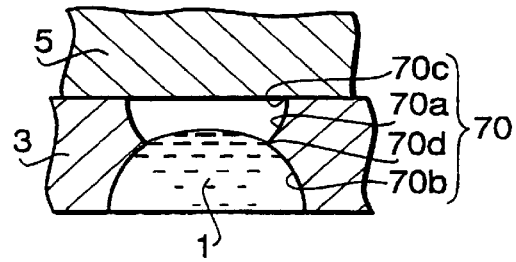
Figure 3G:
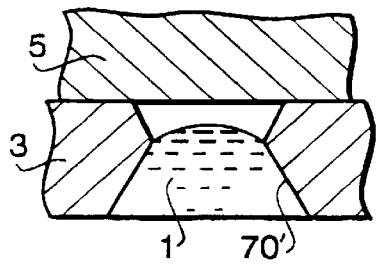

FIG. 3F shows the sixth alternative arrangement. In the sixth alternative arrangement, a fine hole 70 includes two bowl-shaped parts 70a and 70b. Further, a narrow part 70d is provided between the bowl-shaped parts 70a and 70b. The across sectional area of the narrow part 70d is smaller than any other part of the fine hole 70. The inner end of the narrow part 70d forms an apex. The cross sectional area of the upper bowl-shaped part 70a increases as the distance from an exit opening 70c of the fine hole 70 decreases. In this sixth alternative arrangement, since the cross sectional area of the lower bowl-shaped part 70b decreases as the distance from the narrow part 70d decreases, the liquid developer 1 can be easily introduced into the lower bowl-shaped part 70b (from the developing roller 11 of FIG. 1). Further, since the surface area of the top and bottom surfaces of the liquid developer change according to the positions along the depth of the fine hole 70, it is easy to control the gap between the liquid developer 1 and the photosensitive drum 5. In addition, the amount of liquid developer 1 held in the fine hole 70 is larger than previously-described alternative arrangements. FIG. 3G shows another example of the sixth embodiment. In this example, a fine hole 70' has two tapered parts with a narrow part provided therebetween. The cross sectional area of the narrow part is smaller than other part of the fine hole 70'. It is also possible that the fine hole 70' has a plurality of narrow parts.

Figure 3H:
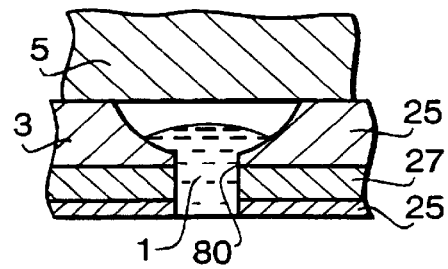

FIG. 3H shows the seventh alternative arrangement. In the seventh alternative arrangement, a fine hole 80 is formed in the same shape as the first alternative arrangement (FIG. 3A). In this arrangement, the developer retainer 3 includes an intermediate part 27 made of a conductive and hydrophilic material. The other part of the developer retainer 3 is made of insulating and water-repellant material. Due to the conductivity of the intermediate part 27, it is possible to charge voltage (for example, minus voltage) to the liquid developer 1 through the intermediate part 27, so that the liquid developer 1 tends to easily fly to the photosensitive drum 5 (charged to plus voltage). Further, even when the repellant force between the liquid developer 1 and the fine hole 80 is too strong, the liquid developer 1 can be kept in the fine hole 80 (due to the hydrophilia of the intermediate part 27).

Regarding the shape of the fine hole, the fine hole 19 of the embodiment (FIGS. 2A and 23) and the fine holes 20, 50, 70 and 80 of the third, fourth, sixth and seventh alternative arrangements (FIG. 3A, 3D, 3F and 3H) are preferable. In the fine holes 19, 20, 70 and 80, the liquid developer 1 tends to stabilize at a position where the cross section changes discontinuously.

Figure 4A:
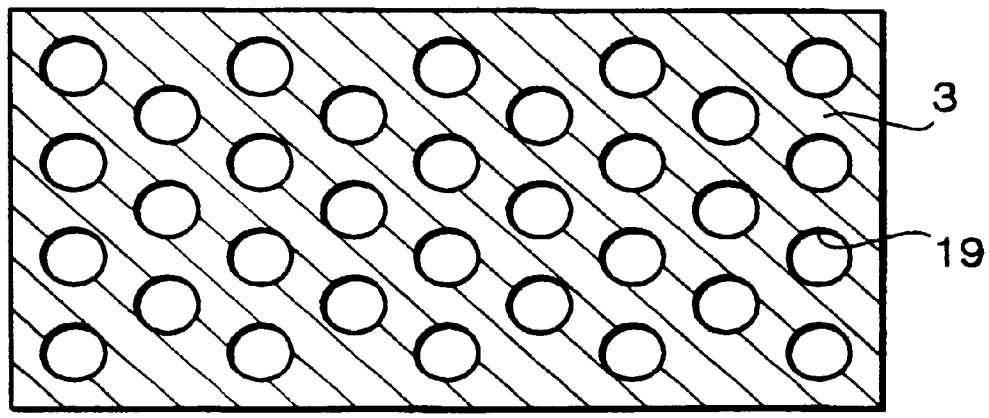
FIG. 4A is an enlarged sectional view showing a cross section of a developer retainer of the embodiment.
Figure 4B:
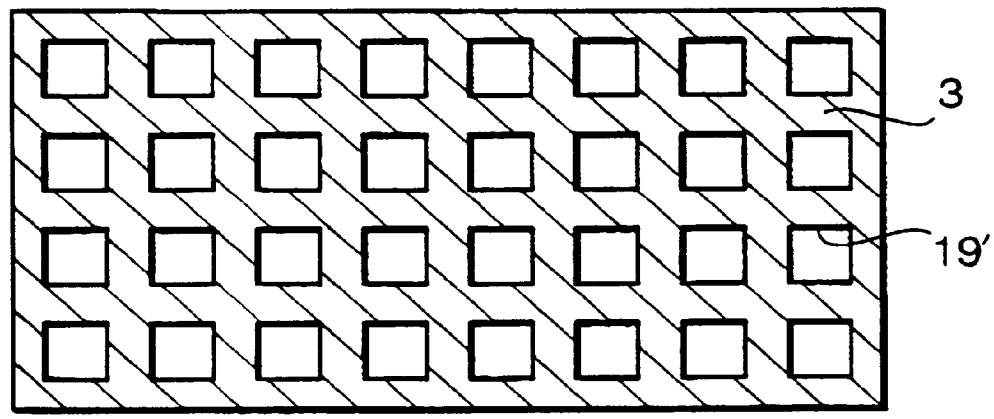
FIG. 4B is an enlarged sectional view showing a cross section of a modification of the developer retainer of FIG. 5A.

FIG. 4A is an enlarged sectional view of the developer retainer 3, showing the shape of the fine hole 19. As shown in FIG. 4A, the fine hole 19 has a rounded cross section. FIG. 4B is an enlarged sectional view of the modification of the developer retainer 3. In this modification, the fine hole 19' has a square cross section. Also, the cross section of the fine hole 19 (19') may have any shape.

The producing method of the developer retainer 3 is briefly described. The developer retainer 3 can be made of water-repellant resin by forming the fine holes 19 by means of laser machining. However, it is advantageous (in terms of cost) to use a relief printing plate made of metal. The relied print plate is made by the laser machining of a metal plate. In the laser machining process, several masks having fine holes of different diameters are used. With this, the relief printing plate having projections of desired shape is made. Alternatively, f needed, the machined surface of the metal plate can be smoothed by means of etching. Further alternatively, the relief printing plate can be made by etching process only. The developer retainer 3 is produced by heating and pressing the uncured water-repellant resin using the above-produced relief printing plate. It is alternatively possible to form the developer retainer 3 by means of etching or electro-casting.

The first to fourth alternative arrangements of the image forming apparatus of FIG. 1 are described with reference to FIGS. 5 to 8. Elements in the arrangements that are identical to elements in the above described embodiment (FIG. 1) are assigned the same reference numerals and the description thereof is omitted.

Figure 5:
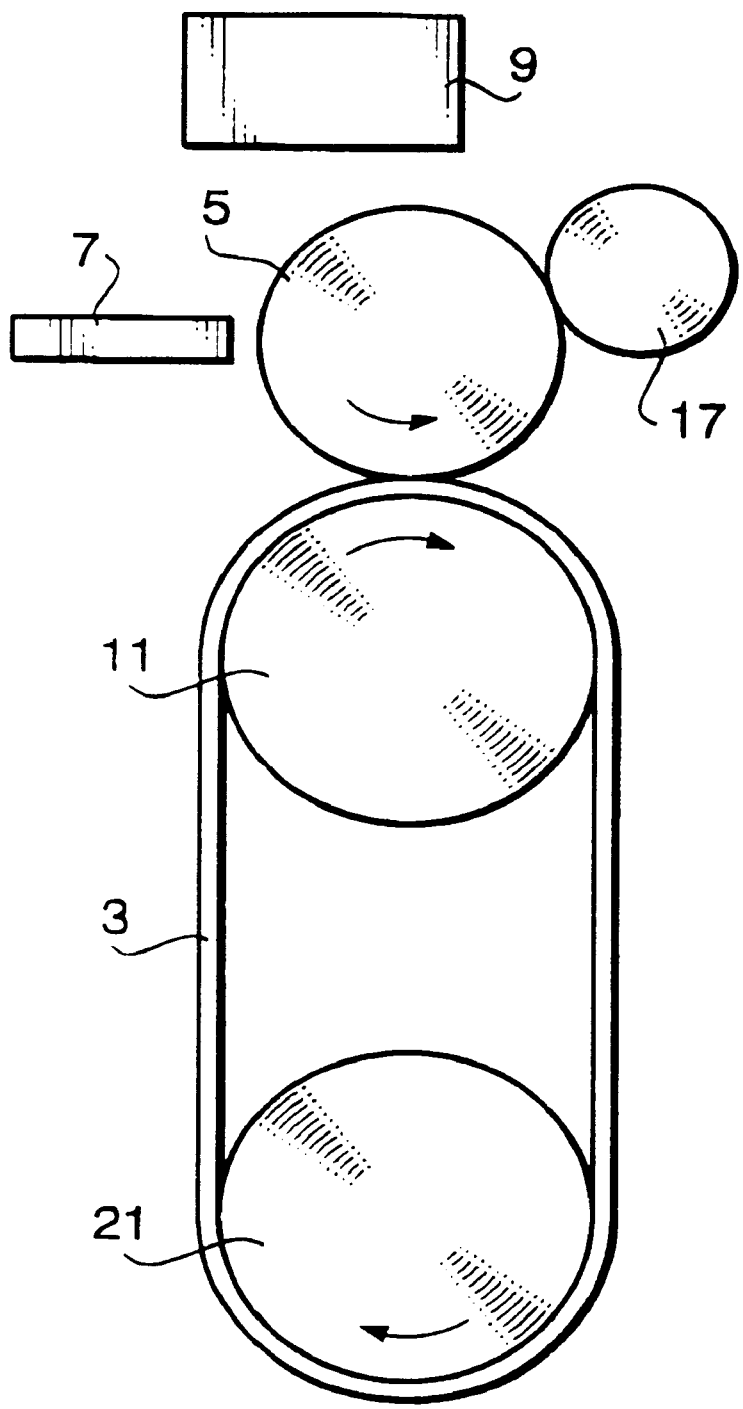
FIG. 5 is a schematic view showing an alternative arrangement of the image forming apparatus of the embodiment.

FIG. 5 shows a first alternative arrangement of the image forming apparatus. In this first alternative arrangement, the developer retainer 3 is provided around the developing roller 11 and an impregnation roller 21, so that the developer retainer 3 circulates along the developing roller 11 and the impregnation roller 21. The impregnation roller 21 is made of a porous roller in which the liquid developer 1 is impregnated. The developer retainer 3 is sandwiched by the developing roller 11 and the photosensitive drum 5, so that the outer surface of the developer retainer 3 contacts the photosensitive drum 5. The developing roller 11, the impregnation roller 21, and the photosensitive roller 5 are rotated by a not-shown mechanism. With such an arrangement, the liquid developer 1 stored in the impregnation roller 21 is carried by the developer retainer 3 to the position between the photosensitive roller 5 and the developing roller 11. Further, the liquid developer 1 is transferred to the photosensitive drum 5 due to the electrostatic force, and transferred to the transfer roller 17 (or a recording media) in a similar manner to the embodiment of FIG. 1. According to this first alternative arrangement, since liquid developer is impregnated in the impregnation roller 21, the spill of the liquid developer is prevent.

Figure 6A:
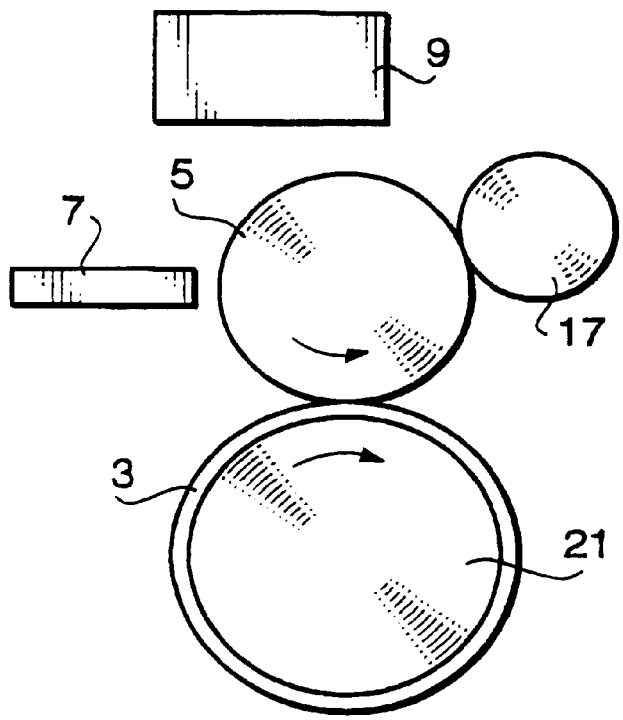
FIG. 6A is a schematic view showing first alternative arrangement of the image forming apparatus.

FIG. 6A shows second alternative arrangement of the image forming apparatus. In this second alternative arrangement, the developer retainer 3 is tubular-shaped and is provided around the porous impregnation roller 21 in which the liquid developer is impregnated. The impregnation roller 21 and the photosensitive drum 5 are disposed so that the developer retainer 3 is sandwiched therebetween. The photosensitive roller 5 and the impregnation roller 21 are rotated by a now-shown mechanism. With such an arrangement, the liquid developer 1 is supplied to the developer retainer 3 from the impregnation roller 21. Further, the liquid developer 1 is transferred to the photosensitive drum 5 due to the electrostatic force, and transferred to the transfer roller 17 (or a recording media). According to the second alternative arrangement, the image forming apparatus is compact in size, compared with the embodiment of FIG. 1 and its first alternative arrangement (FIG. 5). Thus, the image forming apparatus of the second alternative arrangement can be embodied in a handy-type image forming apparatus.

Figure 6B:
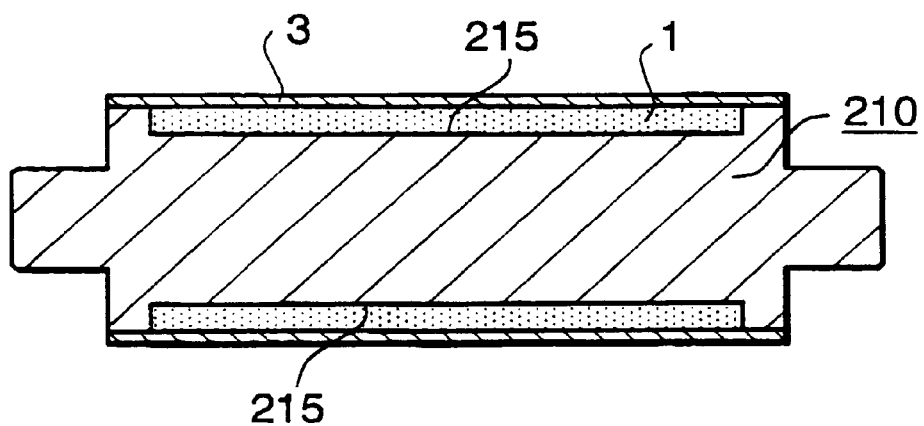
FIG. 6B is a sectional view of another example of an impregnation roller used in the image forming apparatus of FIG. 6A.

FIG. 6B shows another example of the impregnation roller 21. In this example, an impregnation roller 210 has a recess 215 formed on an outer peripheral surface thereof. The recess 215 is filled with the liquid developer 1. The liquid developer 1 transmits from the inner side to the outer side of the developer retainer 3 and is transferred to the photoconductive drum 5 (FIG. 6A).

Figure 7:
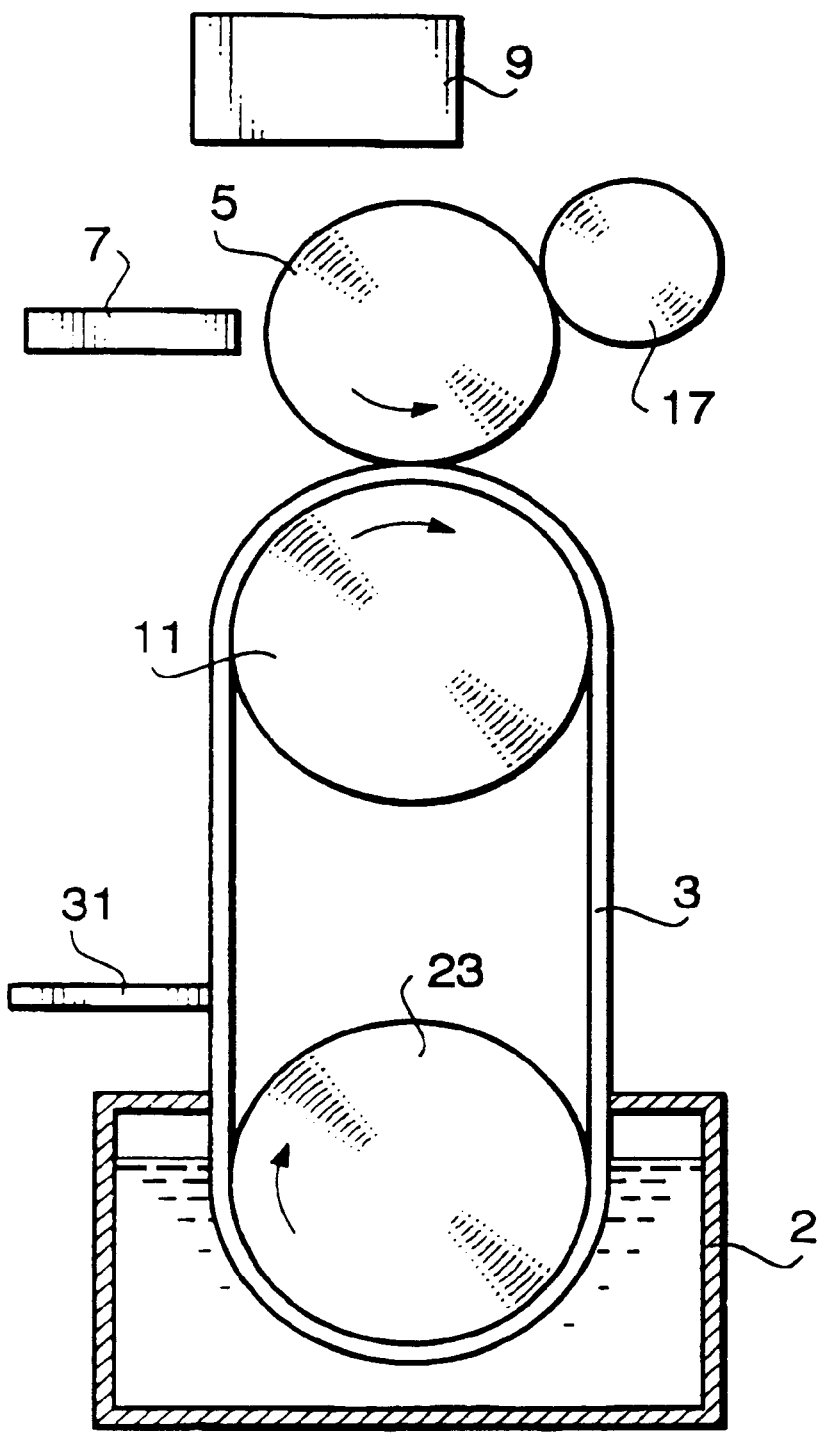
FIG. 7 is a schematic view showing second alternative arrangement of the image forming apparatus of the embodiment.

FIG. 7 shows the third alternative arrangement of the image forming apparatus. In this third arrangement, the container 2 is provided, in which liquid developer 1 is stored. A tank roller 23 is provided so that the tank roller 23 partially soaked in the liquid developer 1 in the container 2. The developing roller 11 is provided outside the container 2. The developing roller ii and the tank roller 23 are rotated clockwise by a not shown mechanism. Further, the developer retainer 3 is provided around the developing roller 11 and the tank roller 23, so that the developer retainer 3 circulates along the developing roller 11 and the tank roller 23. The photosensitive drum 5 is disposed so that the developer retainer 3 is sandwiched by the photosensitive roller S and the developing roller 11. An adjusting member 31 is provided outside the container 2, so that the adjusting member 31 contacts the outer surface of the developer retainer 3 between the container 2 and the developing roller 11. The adjusting member 31 removes the excessive liquid developer 1 adhered onto the outer surface of the developer retainer 3. In particular, a doctor blade, a roller or an air flow unit can be used as the adjusting member 31. The liquid developer 1 stored in the container 2 is caught in the fine holes of the developer retainer 3 and carried to the gap between the photosensitive roller 5 and the developing roller 11. The photosensitive roller 5 receives the liquid developer 1 from the outer side of the developer retainer 3 due to the electrostatic force. According to the third alternative arrangement, a large amount of the liquid developer is held on the outer surface of the developer retainer 3 further, the excessive amount of the liquid developer is removed by the adjusting member 31. Thus, a suitable amount of the liquid developer can be transferred to the photosensitive drum 5 in a unit time.

Figure 8:
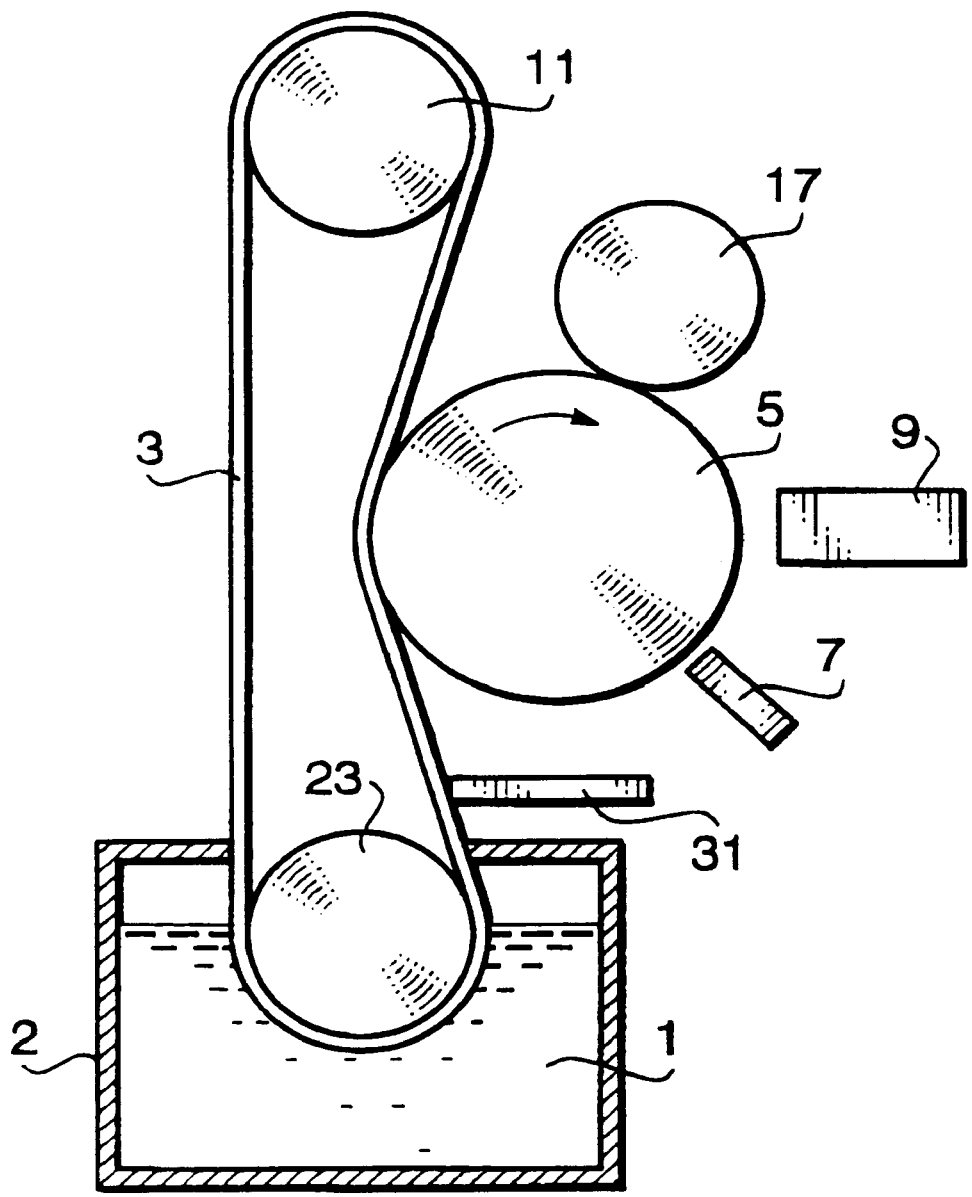
FIG. 8 is a schematic view showing third alternative arrangement of the image forming apparatus of the embodiment.

FIG. 8 shows the fourth alternative arrangement of the image forming apparatus. The developing roller 11, the tank roller 23 and container 2 are disposed in a similar to the third alternative arrangement (FIG. 7). The developer retainer 3 is provided around the tank roller 23 and the developing roller 11 so that the developer retainer 3 circulates around the tank roller 23 and the developing roller 11. In this fourth alternative arrangement, the photosensitive drum 5 is so disposed that the photosensitive drum 5 contacts the developer retainer 3 between the developing roller 11 and the tank roller 23. At a contact portion of the photosensitive drum 5 and the developer retainer 3, the developer retainer 3 bends according to the curvature of the photosensitive drum 5 by a certain length.

With such an arrangement, since a contact portion of the photosensitive drum 5 and the developer retainer 3 is longer than the other alternative arrangements, the amount of the liquid developer to be transferred to the photosensitive drum 5 (in a unit time) is larger than the other alternative arrangements. Thus, the time required for the image forming process becomes short. Also, since the contact angle of the developer retainer 3 and the photosensitive drum 5 is smaller than the other arrangements, image of high resolution can be produced.

In the first embodiment (FIG. 1) and the second alternative arrangement (FIG. 6A), the liquid developer 1 in the fine hole 19 is joined to the liquid developer 1 held on the developing roller 11 (or the impregnation roller 21). In such case, the surface of the liquid developer 1 tends to be rather flat if no pressure is applied to the liquid developer 1. Conversely, in the first, third and fourth alternative arrangements (FIGS. 5, 7 and 8), the liquid developer 1 is independently held in the fine hole 19.

Although the image forming apparatus is described herein with respect to the preferred embodiments, many modifications and changes can be made without departing from the spirit and scope of the invention. For example, the exposure unit 7 and the photosensitive drum 5 can be replaced with a heating unit and a drum with a heat-sensitive surface, so that latent image is formed on the drum by heat.

What is claimed is:

1. An image forming apparatus using liquid developer, comprising:
    an image bearing member which is able to carry latent image;
    a reservoir in which liquid developer is stored, said liquid developer being transferred and adhered to said latent image so that said liquid developer develops said latent image, said liquid developer presenting liquid state at least when said liquid developer develops said latent image;
    a developer retainer having fine holes through which said liquid developer is transferred to said image bearing member, said developer retainer being faced with said image bearing member; and
    a developer supplier which supplies said liquid developer from said reservoir to said developer retainer; and
    wherein each of said fine holes has an exit opening through which said liquid developer moves out of said fine hole and moves to said image bearing member,
    wherein each of said fine holes has a part in which a cross sectional area thereof increases as a distance from said exit opening decreases, and
    wherein an inner surface of said developer retainer is made of material which repels said liquid developer.

2. The image forming apparatus according to claim 1, wherein said fine hole comprises a tapered part and a straight part, said tapered part being proximate to said exit opening.

3. The image forming apparatus according to claim 1, wherein said fine hole comprises a bowl-shaped part and a straight part, said bowl-shaped part being proximate to said exit opening.

4. The image forming apparatus according to claim 1, wherein said fine hole comprises a tapered part with no straight part.

5. The image forming apparatus according to claim 1, wherein said fine hole comprises a bowl-shaped part with no straight part.

6. The image forming apparatus according to claim 1, wherein said fine hole comprises a bell-shaped part.

7. The image forming apparatus according to claim 1, wherein said fine hole comprises two straight holes having different diameters, and
    wherein one of said straight holes has a larger cross-sectional area and is proximate to said exit opening.

8. The image forming apparatus according to claim 1, wherein said fine hole has at least one narrow part located between both opening cf each fine hole, and
    wherein a cross sectional area of said narrow part is smaller than any other part of said fine hole.

9. The image forming apparatus according to claim 1, wherein said fine hole is provided with a hydrophilic part which has a hydrophilia.

10. The image forming apparatus according to claim 1, wherein said fine hole is provided with a electro-conductive part which has a electronic conductivity.

11. An image forming apparatus according to claim 10, wherein said fine hole is provided with a hydrophilic part which has a hydrophilia.

12. The image forming apparatus according to claim 1, said reservoir comprising a container in which said liquid developer is stored,
    said developer retainer comprising an endless-belt which circulates along at a certain circulation path,
    said developer supplier comprising a rotatable feeder which receives said liquid developer in said container at a first rotational position and which transfers said liquid developer to said endless-belt at a second rotational position, and
    said circulation path of said endless-belt including a position where said endless-belt contacts both of said image bearing member and said rotatable feeder.

13. The image forming apparatus according to claim 12, wherein said endless belt is supported by said rotatable feeder and at least two additional rollers, and
    wherein said container is provided in a space surrounded by said circulation path.

14. The image forming apparatus according to claim 1, said reservoir comprising an impregnation member in which said liquid developer is impregnated,
    said developer retainer comprising an endless-belt which circulates around first and second positions,
    wherein said endless-belt contacts said impregnation member at said first position, and contacts said image bearing member at said second position.

15. The image forming apparatus according to claim 14, said impregnation member comprising a porous roller.

16. The image forming apparatus according to claim 15, wherein said endless belt is provided around said porous roller and at least one additional roller, so that said endless belt circulates along said porous roller and said additional roller.

17. The image forming apparatus according to claim 1, wherein said developer retainer is tubular-shaped,
    wherein said liquid developer is supplied to said developer retainer from an inner side of said developing retainer.

18. The image forming apparatus according to claim 1, said reservoir comprising a container in which said liquid developer is stored,
    said developer retainer comprising an endless-belt which circulates along first and second positions,
    wherein said endless-belt is soaked in said liquid developer in said container at said first position, and contacts said image bearing member at said second position.

19. The image forming apparatus according to claim 18, wherein said endless-belt is supported by two rollers so that said endless-belt circulates along said two rollers, wherein one of said two rollers is located in said container.

20. The image forming apparatus according to claim 19, said image bearing member comprising a drum, wherein said drum abuts said endless-belt between said two rollers.

21. The image forming apparatus according claim 1, further comprising an adjusting member which removes an excessive amount of said liquid developer from said developer retainer.

22. The image forming apparatus according to claim 1, wherein the fine holes are through holes.

23. An image forming apparatus according to claim 1, wherein the liquid developer transferred from said developer supplier to said developer retainer is held within the fine holes.

24. An image forming apparatus using liquid developer, comprising:

an image bearing member which is able to carry latent image;

a reservoir in which liquid developer is stored, said liquid developer being transferred and adhered to said latent image so that said liquid developer develops said latent image, said liquid developer presenting liquid state at least when said liquid developer develops said latent image;

a developer retainer having fine holes through which said liquid developer is transferred to said image bearing member, said developer retainer being faced with said image bearing member; and a developer supplier which supplies said liquid developer from said reservoir to said developer retainer; and wherein each of said fine holes has an exit opening through which said liquid developer moves out of said fine hole and moves to said image bearing member, wherein each of said fine holes has a part in which a cross sectional area thereof increases as a distance from said exit opening decreases, and wherein each of said fine holes is a through hole.

* * * * *